(12) United States Patent
Daoud

(10) Patent No.: US 6,918,340 B2
(45) Date of Patent: Jul. 19, 2005

(54) DUAL-STAGE GAS GENERATOR UTILIZING ECO-FRIENDLY GAS GENERANT FORMULATION FOR MILITARY APPLICATIONS

(75) Inventor: Sami Daoud, Bedford, MA (US)

(73) Assignee: Textron Systems Corporation, Wilmington, MA (US)

( * ) Notice: Subject to any disclaimer, the term of this patent is extended or adjusted under 35 U.S.C. 154(b) by 40 days.

(21) Appl. No.: 10/242,742

(22) Filed: Sep. 12, 2002

(65) Prior Publication Data

US 2004/0050283 A1 Mar. 18, 2004

(51) Int. Cl.$^7$ ............................................. F42C 19/08
(52) U.S. Cl. ...................... 102/202; 102/380; 280/741; 149/109.2
(58) Field of Search ............................ 102/202, 380; 280/741; 149/109.2

(56) References Cited

U.S. PATENT DOCUMENTS

| | | | |
|---|---|---|---|
| 3,862,866 A | | 1/1975 | Timmerman et al. |
| 3,898,254 A | * | 8/1975 | Combs et al. .............. 556/144 |
| 3,901,530 A | | 8/1975 | Radke |
| 3,960,390 A | | 6/1976 | Goetz |
| 5,022,674 A | | 6/1991 | Frantom et al. |
| 5,378,018 A | | 1/1995 | Ketterer, deceased et al. |
| 5,482,579 A | | 1/1996 | Ochi et al. |
| 5,593,180 A | | 1/1997 | Cuevas et al. |
| 5,634,661 A | | 6/1997 | Dahl et al. |
| 5,639,986 A | | 6/1997 | Evans |
| 5,707,078 A | | 1/1998 | Swanberg et al. |
| 5,803,493 A | | 9/1998 | Paxton et al. |
| 5,806,885 A | | 9/1998 | Hock |
| 5,820,162 A | | 10/1998 | Fink |
| 5,865,464 A | | 2/1999 | Kanuma et al. |
| 5,876,062 A | | 3/1999 | Hock |
| 5,918,900 A | | 7/1999 | Ennis |
| 5,957,492 A | | 9/1999 | Hofbauer et al. |
| 6,050,601 A | | 4/2000 | Pantke et al. |
| 6,089,597 A | | 7/2000 | Leifheit et al. |
| 6,143,103 A | * | 11/2000 | Ryder .......................... 149/46 |
| 6,156,137 A | | 12/2000 | Lundstrom et al. |
| 6,199,906 B1 | | 3/2001 | Trevillyan et al. |
| 6,237,950 B1 | * | 5/2001 | Cook et al. ................. 280/736 |
| 6,315,322 B1 | * | 11/2001 | Mika .......................... 280/736 |
| 6,340,175 B1 | | 1/2002 | Hughes et al. |
| 6,447,007 B1 | * | 9/2002 | DiGiacomo et al. ........ 280/741 |
| 6,669,230 B1 | | 12/2003 | Nakashima et al. |
| 2002/0006178 A1 | | 1/2002 | Takagi |

OTHER PUBLICATIONS

Fedoroff et al., "Encyclopedia of Explosives and Related Items," Picatinny Arsenal (Dover, New Jersey), p. A333, (Sep. 5, 1960).

Dornheim, Michael A., "Airbag Passes Test on Mars," Aviation Week & Space Technology, (Jul. 14, 1997). 1 page.

"LLM–105 Process Development", (visited Aug. 16, 2002) <http://www.cms.llnl.gov/LLM>. 2 pages.

* cited by examiner

Primary Examiner—Stephen M. Johnson
(74) Attorney, Agent, or Firm—McDermott Will & Emery LLP

(57) ABSTRACT

This invention relates to a gas generator having two or more compartments, each with a separate initiator, with one compartment discharging before another, i.e., the compartments discharge sequentially. Each compartment has the same propellants, but the propellants have different geometries in each compartment, which results in different rates of gas evolution from each compartment. The gas generator has a rapid initial inflation, followed by a more gradual inflation rate in the subsequent stages, improving safety to occupants. One propellant used for the gas generator comprises (1) ammonium nitrate as the oxidizer, (2) a fuel such as CL-20. and (3) a binder such as polycaprolactone. A second propellant comprises by weight approximately 70–95% energetic nitrate fuel, 5–25% energetic polymer binder and 0.1–5% flash suppressant. No hot metal particles (e.g., CuO) are generated in the new systems.

14 Claims, 14 Drawing Sheets

DIMENSIONS ARE IN MM.

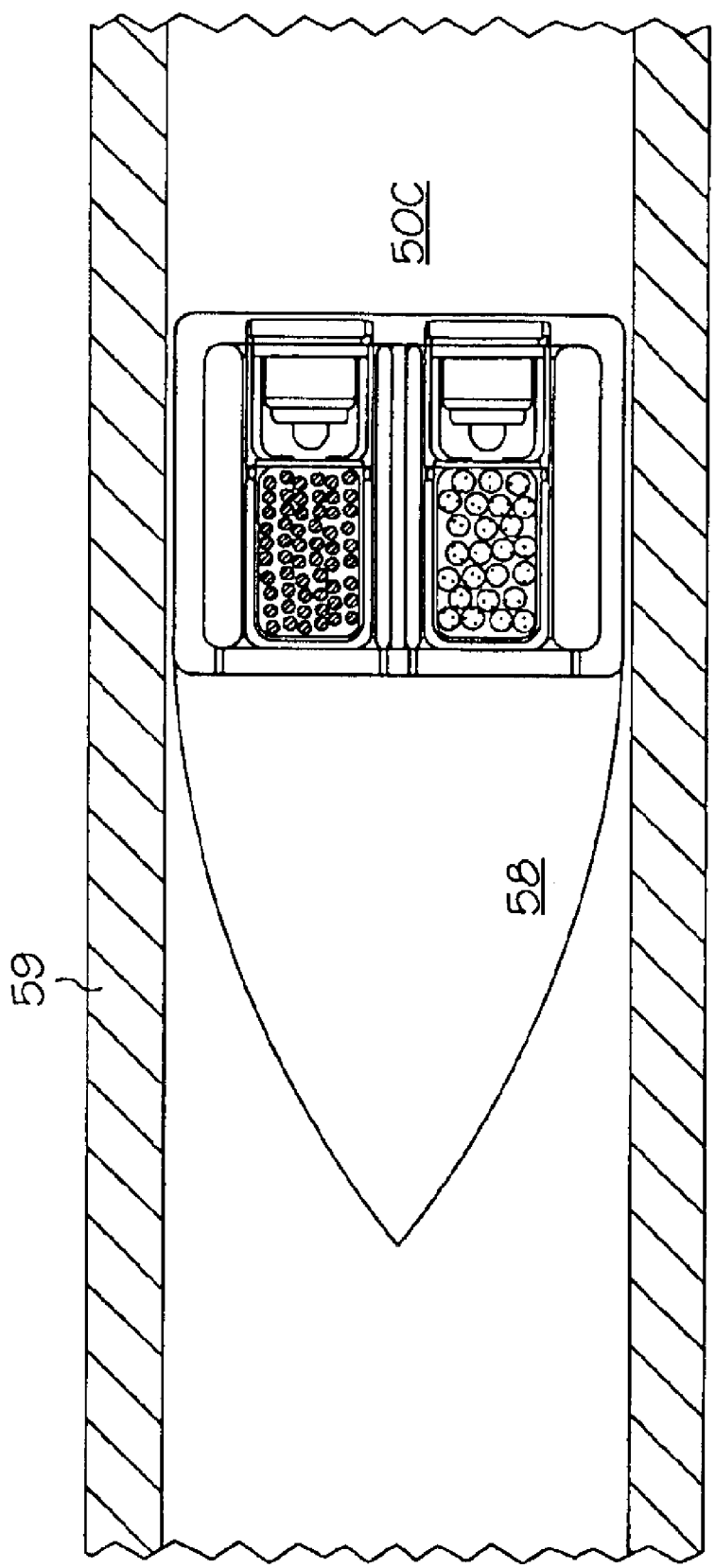

TYPE A

TYPE B

TYPE C

TYPE D

TYPE E

TYPE F

DUAL-STAGE GAS GENERATOR UTILIZING ECO-FRIENDLY GAS GENERANT FORMULATION FOR MILITARY APPLICATIONS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates to a multi-stage gas generator that utilizes an improved gas generant formulation. Gas generators (also known as inflators) have numerous military applications. For example, they are used to inflate airbags used in deploying and aiming submunitions. Gas generators operate by burning a propellant contained therein extremely rapidly, usually in the millisecond range. Most of the discussion in this application relates to deploying submunitions, but similar principles apply to all types of inflators.

Until now, gas generators have burned the propellant in airbags in one stage, causing, providing less than optimal control over the deployment.

The propellants used in airbags have generally contained sodium azide, which, upon ignition, yielded particulates, including hot metallic oxides, and corrosive products, thus requiring expensive filtering systems to be certain these products do not damage the munitions or related equipment. Alternative propellants have produced high temperature effluent and/or $NO_x$ gases, which also have required systems to protect the equipment. Such airbag systems have also required various protective coatings, in order to prevent damage to the bags caused by the harmful by-products of combustion.

To date, uniform and reliable gas generation, for the systems indicated above, has been difficult to achieve, both mechanically (with respect to gas generation rate or slope) as well as chemically (with respect to control of the solid particulates and effluent resulting from propellant combustion). To date, at least one or more of the components (e.g., oxidizers) of the gas generants have been metal-based, leading to the formation of hot metallic solids or particulates as byproducts of combustion. The major airbag manufacturers still continue to use sodium azide ($NaN_3$) as the main fuel constituent in their gas generant formulation and metallic oxides (e.g., copper oxide, iron oxide, molybdenum trioxide) as major oxidizer constituents in their formulations. These formulations generate, upon combustion, very hot copper-based, iron-based, or molybdenum-based solid byproducts, as well as NO, $NO_2$, $SO_2$, CO, and $CO_2$, and which many times can escape controls. Some of these combustion byproducts are extremely toxic to humans and are of great concern, despite the assurances of manufacturers that current gas generators produce such gas generant byproducts in only small quantities.

Some airbag systems have been based on propellants aside from sodium azide (see, for example, U.S. Pat. No. 5,482,579, where cellulose acetate, perchlorate and a metal oxide were used). However, these systems still generate hot metal particles or toxic or hot gases that require a filtration system to prevent harm to the airbags.

Other variations in airbags have been explored. For example, some use a mechanical means to control airflow in airbags. See, for example, U.S. Pat. No. 6,050,601. Mechanical means are, however, relatively slow compared to the extremely fast inflation required in airbags. Others have used systems that rely on stored gas for inflation. See, for example U.S. Pat. No. 6,089,597. Because of the difficulty in maintaining stored gas for long periods of time, these systems have not been widely used.

U.S. Pat. No. 5,876,062 relies on using a resistance wire to ignite the propellant. Vibration of the airbag system will cause the ignition wire to break, leading to malfunction of the system. Furthermore, a filtration system is also required. U.S. Pat. No. 6,199,906 relies on electronic logic to determine the extent to which the airbag is deployed. However, the system still generates noxious effluent and attempts to eliminate them through certain gas ports. Furthermore, the system recognizes that there may be accidental ignition of some portions of the system when exposed to heat or fire.

BRIEF SUMMARY OF THE INVENTION

This invention relates to a gas generator having two or more compartments, each with a separate initiator, with one compartment discharging before another, i.e., the compartments discharge sequentially. Each compartment has the same propellants, but the propellants have different geometries in each compartment, which results in different rates of gas evolution from each compartment. The gas generator of the present invention is designed to reach maximum inflation (i.e., to deploy) in the same amount of time as the current, single-stage gas generators. However, compared to previously known gas generators, the generator of the present invention has a more rapid initial inflation, with a more progressive propellant geometry, followed by a more gradual inflation rate in the subsequent stages, improving safety to occupants.

In general terms, one propellant (or gas generant) used in a new gas generator includes (1) ammonium nitrate as the oxidizer, which is non-toxic and non-corrosive, as opposed to existing airbag propellant formulations, (2) a fuel having a high energy density and high stability, such as hexanitrohexaazaisowurtzitane (CL-20)—or other suitable fuels, the characteristics of which will be described below, and (3) a binder such as polycaprolactone (PCL), polyisobutylene (PIB), or glycidyl azide polymer (GAP). Fuels that may be used as alternatives to, or in combination with, CL-20 for the fuel of the present invention have comparable or greater values of the following physical characteristics: density, heat of formation, and heat of decomposition. Examples of such suitable fuels include, but are not limited to, tri-aminotrinitro-benzene (TATB) and 2,6-diamino-3,5-dinitropyrazine-1-oxide (LLM-105).

A second propellant comprises approximately 70–95% energetic nitrate fuel, 5–25% energetic polymer binder and 0.1–5% flash suppressant.

No hot metal particles (e.g., CuO) are generated in the system of the present invention. This means that the complex, expensive filtering system in the current airbag systems is not needed, nor is there a need to use coated airbags.

BRIEF DESCRIPTION OF THE FIGURES

FIG. 5, including FIGS. 5A–C, shows an airbag deploying a parachute to decelerate a submunition and to control its speed and trajectory.

DETAILED DESCRIPTION OF THE INVENTION

Figure 1A:
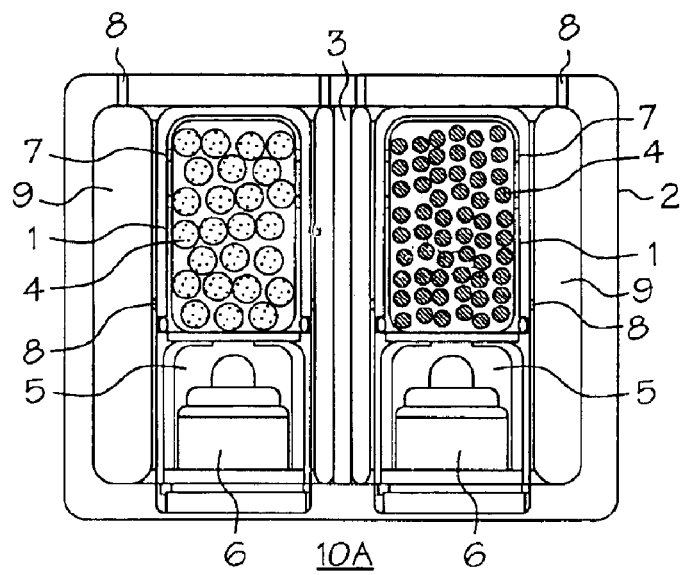
FIG. 1 shows a two-stage gas generator. For a miniature design, the parts are identified in FIG. 1A and typical dimensions are shown in FIG. 1B. For a larger gas generator, the parts are shown in FIG. 1C and the dimensions in FIG. 1D.

This invention relates to a new type of gas generator that is usable in military applications, such as in airbags used for deploying submunitions, aiming warheads, producing oxygen in oxygen generating devices and other applications. These gas generators have at least two chambers, which condition allows the respective gas volumes to be produced under different conditions, i.e., the profile of pressure vs. time for the gas volume produced by each chamber can be different. In this way, by designing multiple chambers differently, the gas generator can be adapted to the need of the particular application. For example, in order to improve control of the trajectory, a dual-chamber gas generator can be used, with one chamber being designed to provide an initial very quick (compared to previously known gas generators) partial deployment of the airbag, and the second chamber being designed to provide a second, much slower expansion of the airbag. The sequential release of gas from each chamber of the gas generator, and subsequent gradual inflation of the airbag, provides, for example, improved control of the trajectory of the munition or submunition during its horizontal and transitional paths and during its downward free fall.

A variety of design considerations must be taken into account in developing an airbag system. First, the inflator must be capable of producing and/or releasing a sufficient quantity of gas to the airbag within the time limitation required of the air bag systems. Given the time limitation involved in military airbag systems, the airbag must deploy in roughly about 5–100 milliseconds, depending upon the size of the airbag. Inflators must generally be capable of filling an air bag in these time frames with 15 to 200 liters, depending on the intended application.

In its operation, the gas generator receives a signal from an exterior or interior source, and then sends this signal to each initiator. The timing of the inflation of the airbag can be triggered by either a signal transmitted to the gas generator, a sensor (such as an infrared (IR) sensor in the submunition that detects targets that match a defined set of IR requirements), a detector (such as a direction sensor determining the point in the trajectory), a timer, data programmed into a computer incorporated in the weapon, or other techniques. The initiators function sequentially, with a delay (on the order of millisecond(s)) between the ignition of each initiator. The gas generant in each chamber of the dual-chamber gas generator is generally the same, formulation-wise, with each gas generant having a different geometry. Essentially, the gas generants may have a cylindrical, hexagonal, or rosette (the most efficient) geometry, with 37, 19, 7, or 1, (or none at all) perforations. Depending on the desired application, the second gas generant in the second chamber (as well as any subsequent gas generants in additional chambers) may be less progressive (with fewer perforations), neutral, or regressive as compared to the first gas generant. In a preferred two-chamber airbag, the ratio of gas generation in the first chamber to that in the second chamber is greater than one. For example, for the gas produced by the first chamber, the change of pressure as a function of time may be two (or more) times greater than the change of pressure as a function of time for the gas produced from the second chamber.

Solid propellants may be divided into two classes: gas generators and rocket motor propellants. This division is based primarily on their energy content. Gas generator propellants generally contain ammonium nitrate as an oxidizing agent and have only a small amount or no metallic additives. Sometimes (as in the case of N-5, the gas generator of the U.S. Army's Wide Area Munition (WAM) reserve battery) double base compositions may be used as gas generators or propellants. Compositions containing nitramines (cyclotrimethylenetribitramine (RDX), cyclotetramethylene-tetranitramine (HMX), ethylenedinitramine (EDNA), nitroguanidine or guanidine nitrate (NGU), etc.), ammonium perchlorate, etc., may be used as the oxidizer. Ammonium perchlorate is one of the popular oxidizers for rocket motor propellants; metals such as aluminum are often added to increase the energy content. As the energy content of the propellant increases so does the flame (combustion) temperature. Flame temperatures of most gas generator propellants range from 1600° to 3000° F., while rocket propellants generally have flame temperatures that range from 3000° to 6000° F.

Solid propellants to be considered herein are those with flame temperature between 1600° and 3000° F. The fuel used may be synthetic rubber, or a plastic selected on the basis of chemical structure, mechanical properties, and processability. Some of the materials commonly used are butadiene-acrylic acid, butadiene/methylvinylpyridine, cellulose acetate, nitrocellulose, polyisoprene, and polyvinylchloride. The oxidizing agent most commonly used in almost all gas generator propellants is ammonium nitrate. All composite propellants contain additives in one form or another to achieve the desired burning rate, temperature sensitivity, flame temperature, gas output, and physical properties.

Multibase solid propellants are also used as gas generants. As a matter of fact, this is the type of solid propellant formulation used in the WAM battery gas generator. These, as previously discussed, generally have a higher flame temperature (between 2300° and 3500° F.) and have more solid particles in the exhaust. These homogeneous formulations are basically of unstable chemical compounds such as nitrocellulose and nitroglycerin, which are capable of combustion in the absence of all other materials (extremely easy-to-ignite propellants). The most common propellant of this type, called double-base, is largely a colloid of nitroglycerin and nitrocellulose. Mixing of double-base propellant ingredients is generally carried out, as in the case of N-5 propellant, by charging raw ingredients to a mixer in a particular sequence to achieve desired properties of the finished propellant. Mixers in common usage are horizontal and vertical types, i.e., the axis of rotation of the mixing blades is either vertical or horizontal.

Action of the blades is to thoroughly disperse, mix and incorporate the various ingredients into one homogeneous blend. This mixing is closely controlled as to rate (speed of blade rotation) and time; over- or under-mixing can produce a propellant that does not meet ballistic or physical property requirements.

Solid propellant grains can be formed by extrusion (as in the case of N-5 propellant), compression molding, or casting. Since most propellants are limited by their chemistry to one or two of these methods and since some grain geometries are more suited to one processing method than the other, it is seldom possible to form a particular grain by all the available methods. Therefore, it is necessary to determine whether the specific formulation and shape desired are suited to the processing techniques available. Grains can be machined by equipment found in most well equipped machine shops.

Figure 6A:
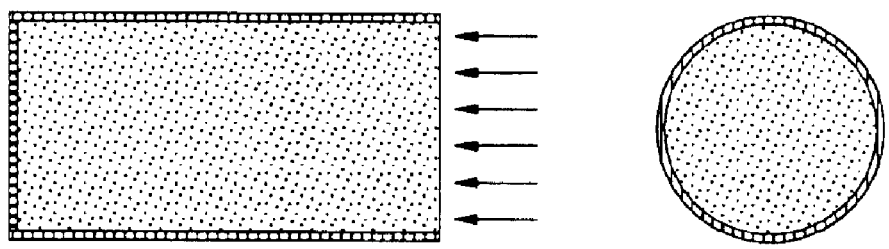
FIG. 6A—neutral burning, FIG. 6B—progressive burning, FIG. 6C—uniform burning.
Figure 6B:
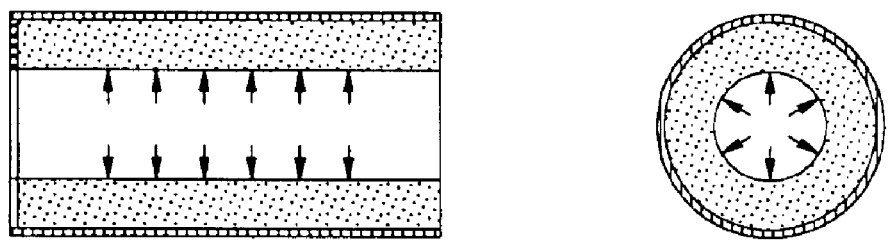
FIG. 6 shows propellant grain configurations.
Figure 6C:
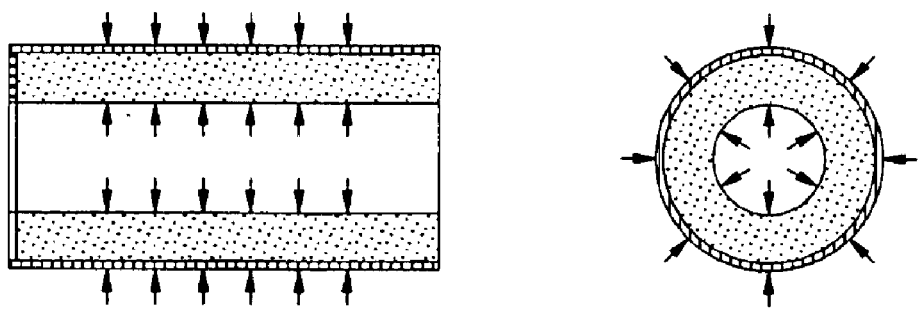

Energy release rate of solid propellant gas generator depends greatly on the grain configuration. The possible geometric configurations are virtually limitless. Most applications require a relatively constant energy for a time of 20 to >100 seconds or a short duration of 1 to 10 seconds at a relatively high energy release rate. Typical propellant grain configurations are shown in FIG. 6.

The end- or cigarette burning rate (FIG. 6A) is restricted on the diameter and one end, leaving the other end exposed and free to burn uniformly (neutral burning) for the entire length. This configuration is used for the longer duration, low energy release rate. The configuration shown in FIG. 6B has restrictor (also shown as 114 in FIG. 11) or deterrent applied to all surface of the grain except the inner diameter. When this exposed propellant is ignited, it will burn outwardly, exposing more and more propellant as the flame front progresses. This configuration will produce a progressive energy release rate. The grain configuration shown in FIG. 6C has the inner and outer diameter unrestricted. With both the inner and outer diameter ignited, the energy release will be of uniform rate; however, the time of burning will be considerably shorter than with the end burner shown in FIG. 6A. Many other configurations and special geometries are used to obtain the desired energy release rate. Commonly used geometries may be 7 and 19 perforation, cylindrical granules (progressive) and multi-perforated rosette type configurations (high efficiency).

The notion of energy release rate is primarily what is referred to as the relative quickness of a propellant grain from the start of the ignition cycle to the end [d (dp/dt)/dt]. This rate is also referred to as the relative quickness ($R_q$) or vivacity. Relative quickness is controlled by propellant geometry, i.e., grain diameter, perforation diameter, web length and the number of perforations. Such propellants are referred to as quick propellants and generate pressures in a closed chamber in fractions of a millisecond. Quick propellants almost always require deterrents (inert) to slow their burning time to an acceptable safe rate. Such deterrents are applied to the surface of the propellant in one of many coating techniques.

The three most common deterrent coatings in use by the solid propellant community are polyester plasticizer (Paraplex) (Hercote), Diethylene Glycol Dimethacrylate (DEGDMA) and DibutylPhathalate (DBP). The first two deterrent coatings have proven very effective in reducing the rate of energy release upon ignition of propellant grains. DBP however, appears to migrate over extended periods of time, in particular at temperatures above 140° F. This migration leads to performance problems.

When propellants are deterrent-coated, the coating normally impregnates the grain throughout, but remains on the surface in relatively higher concentration. This, as a result, leads to a burning slow-down i.e. pressure reduction/control in the initial stage of the ballistic cycle. In the case of DBP, the coating, due to its low molecular weight, migrates to the center of the grain until equilibrium is attained, when equal distribution of the coating is attained throughout the grain. As a result, upon ignition of the grain, the energy release rate is relatively higher than expected leading to LAT failures (higher sigma).

Propellant burning rate is the rate at which the combustion zone progresses into a mass of propellant (mass burning rate). Burning rate is a function of the particular propellant formulation, the chamber pressure, and the propellant temperature. Normally, burning rate, at a specific propellant temperature, may be expressed as:

$$r=aP^n \text{ or } r=a(p/1000)^n$$

If burning rate versus pressure is plotted on a logarithmic paper, the curve is a straight line, with the slope of the line as "n" and with "a" as the burning rate intercept at 1 psia or 1000 psia.

Most solid propellants follow this straightline function; however, with some propellants the pressure exponent (n) is not a constant; that is, it may vary at high or low pressures, or with a few propellants it remains a constant over a limited range of pressures. With the latter types of propellants, burning rate data must be derived from empirical data or burning rate plots. Propellant burning rate is also dependent on the ambient propellant temperature. The temperature sensitivity is usually not a constant. It varies with ambient temperature, decreasing at high and low temperatures, hence it is usually given for a specific temperature range; normally 160° to −65° F. Temperature sensitivity at constant pressure, $\sigma_p$, is given by:

$$\sigma_p(\%/F)=\{[\ln(r_2/-r_1)]/(T_2-T_1)\}\times 100 \ P_c=\text{constant in gas generator}$$

Temperature sensitivity of pressure system with a constant burning area-to-nozzle area ratio is given as:

$$\pi_k(\%/F)=\{[\ln(P_{c2}/P_{c1})]/(T_2-T_1)\}\times 100 \ K_n=\text{constant in gas generator}$$

Figure 7:
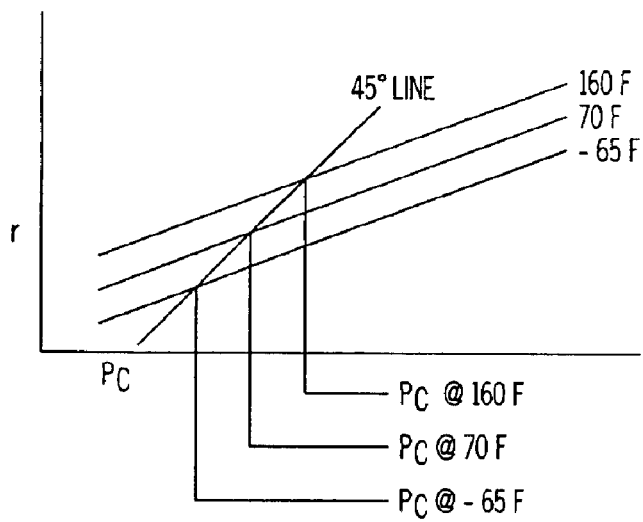
FIG. 7 shows a logarithmic plot of burning rate vs. pressure at various temperatures.

On a logarithmic plot, this is represented by the intercepts of the burning rate-vs.-pressure lines at various temperatures with a 45° slope line, as shown in FIG. 7.

The relationship between $\sigma_p$ and $\pi_k$ is:

$$\pi_k=\sigma_p/(1-n)$$

Figure 8:
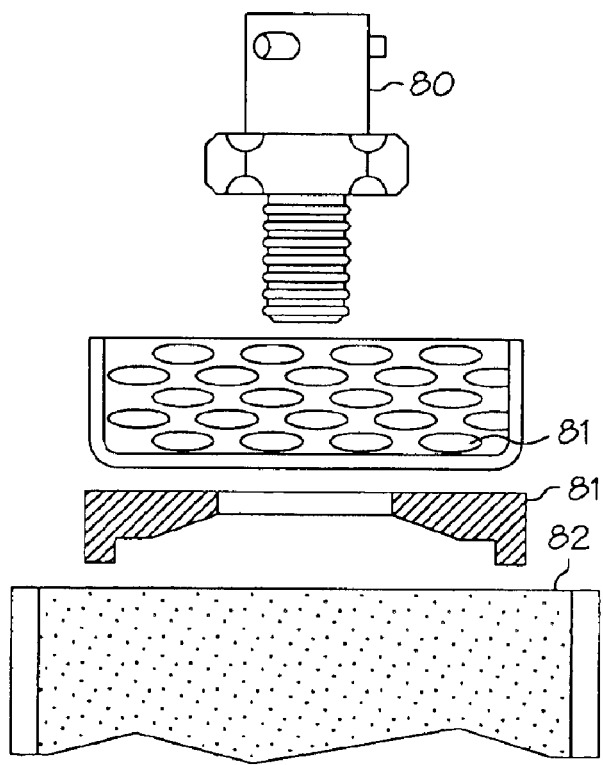
FIG. 8 shows a representative ignition train.

Ignition systems for solid propellant gas generators are required to produce rapid, reliable ignition of the propellant grain over a wide temperature range. These systems are often quite complex and are made up of a number of components as shown in FIG. 8, which shows an initiator 80, a secondary charge 81, and an initial burning surface 82.

Because of the many different applications for gas generators, the requirements placed on the ignition system for specific units vary widely. Consequently, every phase of the gas generator operation, from the method of initiation to the effects of the exhaust gas products, must be thoroughly considered. Some of the ignition parameters most frequently specified by the user are the time required for ignition (time interval between signal to start burning and achievement of steady burning of the grain), maximum ignition pressure, igniter combustion products, and the range of temperatures and pressures at which reliable ignition must take place.

The ignition system used in the WAM reserve battery consists of an electrically actuated initiator, a pyrotechnic or secondary charge, and the propellant grain (as will be seen shortly). The initiator ignites the secondary charge, which ignites the N-5 propellant grain surface. The initiator ignites the secondary charge, which ignites the propellant grain initial burning area. The secondary charge must provide energy over an adequate time to complete ignition of the grain surface and pressurize the gas generator free volume. The word "booster" is frequently used in identifying the sustaining charge of an ignition system.

Energy output of the initiator is small when compared to the total energy required for grain ignition, as its function is only to ignite an easily ignitable pyrotechnic material in close proximity. Some designs require additional energy during the initial portion of firing to compensate for heat losses into the inert gas generator components; for this, the grain initial burning surface is contoured, through grooves, slots or holes, to provide additional burning surface. This contouring soon burns out leaving the desired burning surface.

In designing an ignition system, to meet specified requirements, certain parameters are usually fixed, or they can be varied within only very narrow limits. Fixed parameters relate to the initiating mechanism for the igniter, type and configuration of the propellant, chamber design, and nozzle or orifice size. Igniter performance, which must be varied to comply with the end-item requirements under the conditions imposed by other design features, includes:
1. Choice of primary initiator;
2. Type of ignition train (secondary charge);
3. Composition of the ignition materials;
4. Density and shape of the secondary ignition charge (compacted, loose, etc.);
5. Igniter hardware design, including electrical connections (pigtails, AN connector, etc.).

For reliable ignition, most gas generator propellants require steady input of energy; first to decompose the binder and oxidizer, and then to allow the combustion process to reach equilibrium condition. Igniters based on this principle are referred to as "sustainer" igniters. In summary, ignition system functions can be summarized as:
1. Provide thermal energy a rate and quantity sufficient to ignite the propellant grain;
2. Pressurize generator free volume; and
3. Furnish gas and/or heat to supplement grain output until thermal equilibrium is attained.

Step 3 is a regressive requirement since thermal equilibrium is approached asymptotically. Proper ignition design should, therefore, include:
1. A fast-burning charge designed to rapidly pressurize the case and burn out on pressurization;
2. A sustainer whose energy output approximates a right triangle as a function of time;

Maximum energy output is required to pressurize the case and start the ignition process. The sustainer is initiated by the pressurization charge and regresses from a maximum initial output to zero at the point at which thermal equilibrium is attained. This ignition system model serves as the basis for design of ignition systems having "smooth" pressure-time characteristics: i.e., rapid pressurization to operating pressure, with no significant peaks, followed by neutral pressure-time curve throughout burning. Empirical equations have been developed to estimate the igniter energy requirement. Final tailoring of the igniter is conducted through ballistic testing of the gas generator system.

The techniques used to provide the model ignition requirements vary widely. Some typical systems are depicted in FIG. 9. However, most ignition systems consist of the following components:
Initiator, 91
Primer, 92
Booster, 93
Sustainer, 94
Where 3 and 4 form the secondary charge.

Figure 9A:
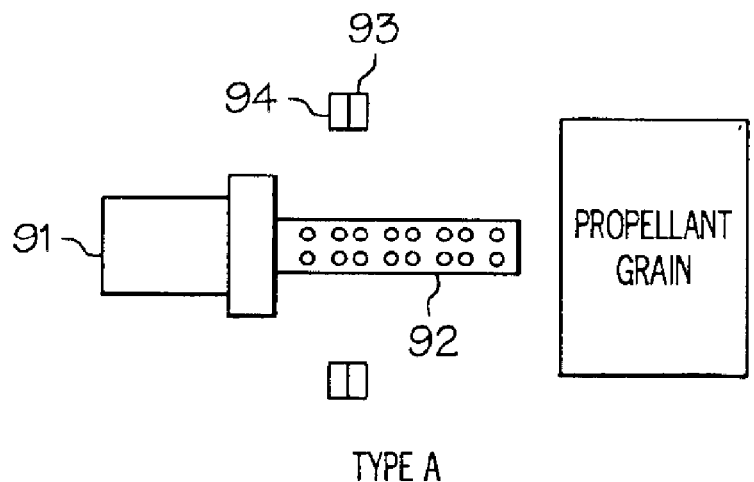
FIG. 9 in FIGS. 9A–F shows various ignition systems.
Figure 9B:
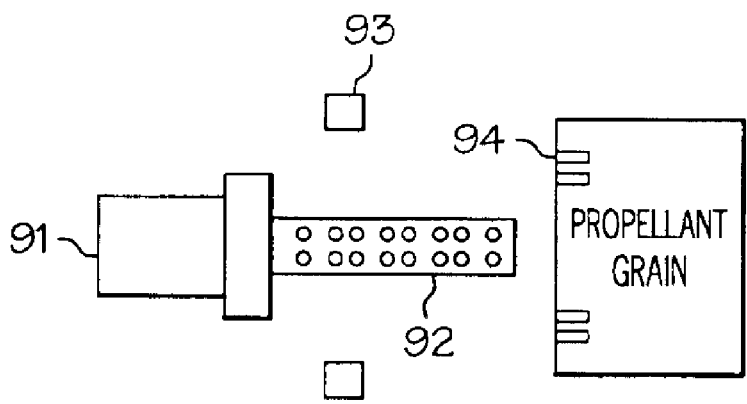
Figure 9C:
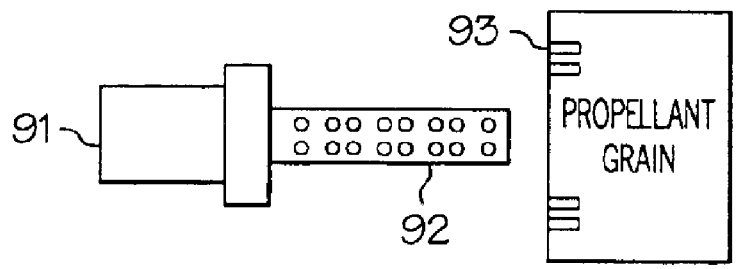
Figure 9D:
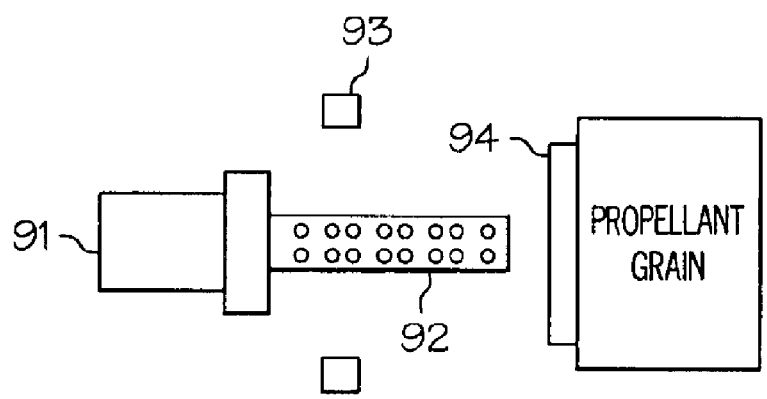
Figure 9E:
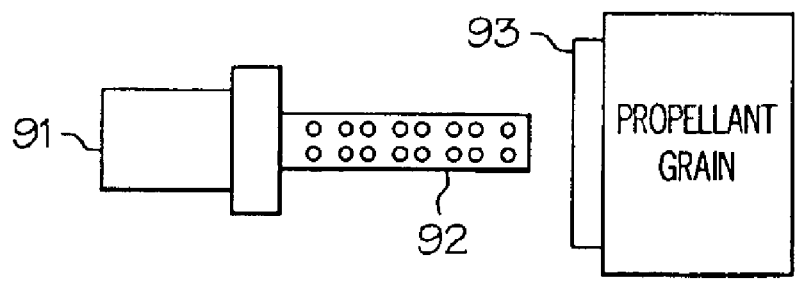
Figure 9F:
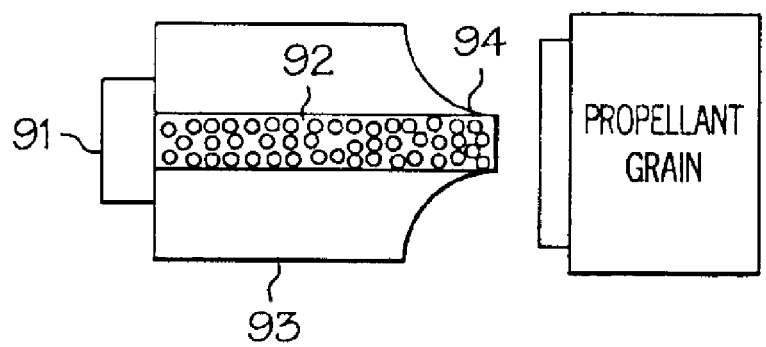
Figure 10:
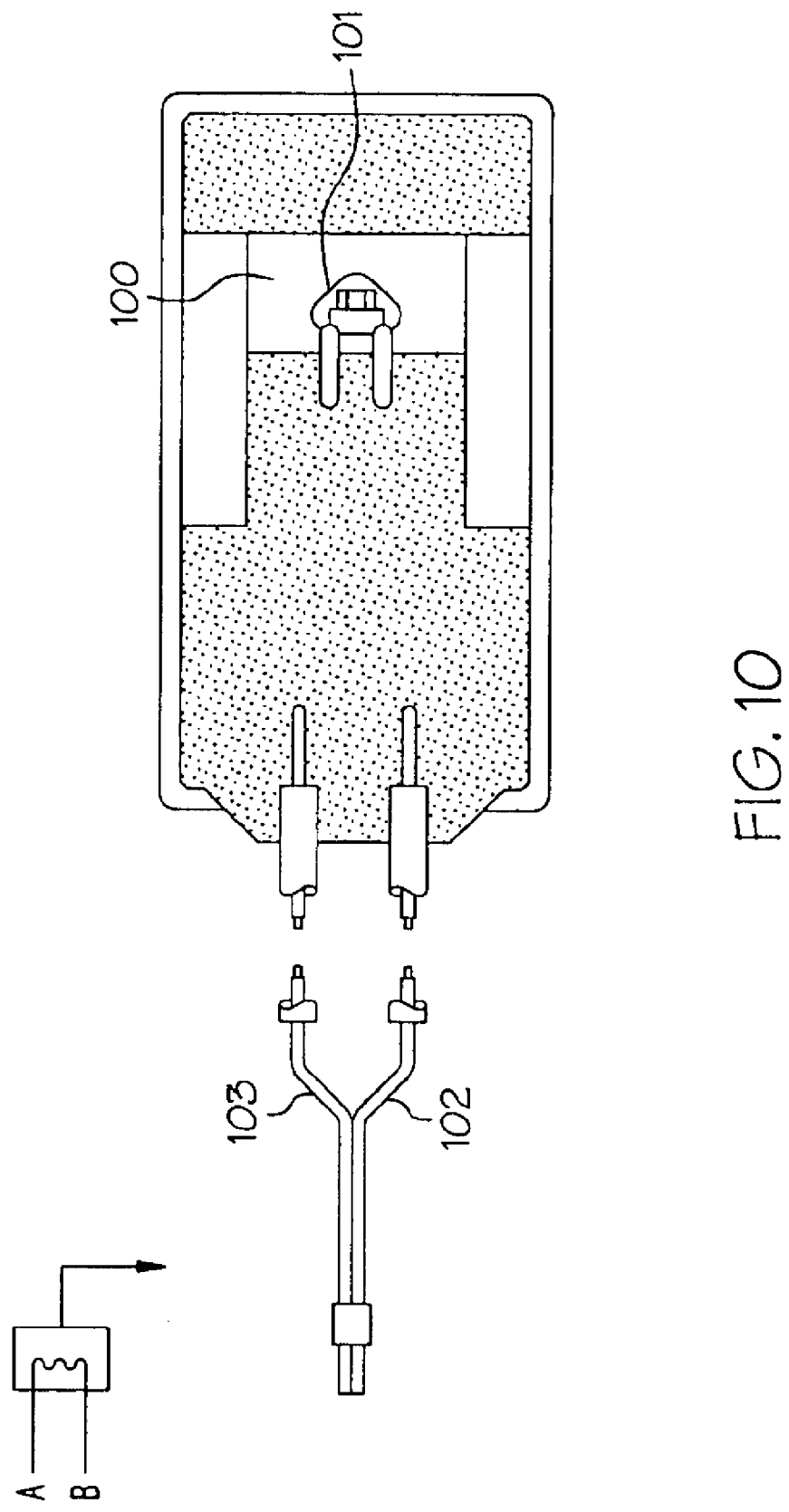
FIG. 10 shows an electrically operated initiator.

As shown in FIG. 9C and FIG. 9E, respectively, type c and type e ignition systems resemble the current ignition system used in the WAM reserve battery. Initiation devices may be divided into two main categories, electrically (WAM battery system) or mechanically operated. Electrically operated initiators 100 (as shown in FIG. 10) are either hot wire- or exploding bridge-wire-initiated. Mechanically operated initiators are actuated by impact or shock, but will not be discussed here (outside of the scope of this discussion).

The hot wire initiator has a resistance wire or element mounted between two electrodes 102, 103. This element is coated with a low ignition temperature pyrotechnic bead. Electric current flowing through the bridge-wire 101 or element raises the temperature of the pyrotechnic to above its auto-ignition temperature, initiating the pyrotechnic and the remainder of the pyrotechnic train. The resistance of the wire and the ability of the initiator elements to conduct heat away from the pyrotechnic determines the no-fire and all-fire characteristics of the initiator. High current initiators (1 ampere/1 watt to 5 ampere/5 watt) have large heat sinks or heat dissipation ability.

Exploding bridge-wire initiators are similar to the hot wire type except that a high energy (electric) pulse applied across the bridge-wire 101 causes it to vaporize, thereby converting electrical energy into thermal energy and igniting the adjacent pyrotechnic material. A gap is often used in the initiator circuitry to provide an open circuit to direct currents; but for a high voltage pulse this gap is bridged and the resistance wire is exploded.

In the Ignition Secondary Charge, rapid, reliable, reproducible ignition over the desired temperature is the goal for any solid propellant gas generator. Because of the many different applications for gas generators, the requirements placed on the ignition systems vary widely. Consequently, every phase of gas generator initiation must be thoroughly considered. Parameters most frequently specified are rate of ignition, maximum allowable pressure on ignition, igniter combustion products, and range of temperature over which operation of the ignition system is desired.

Figure 11:
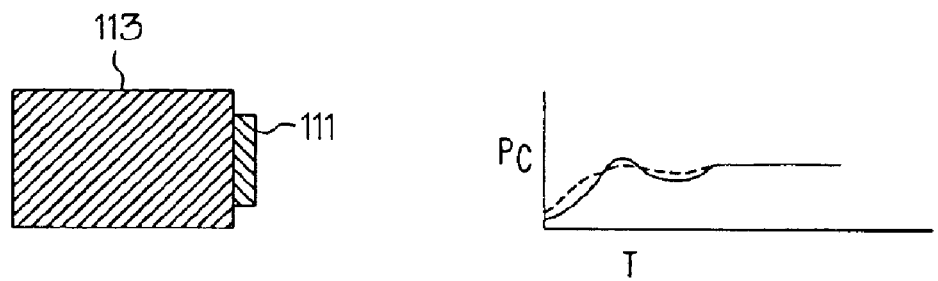
FIG. 11 shows ignition initiation for different configurations cut into the grain face of the propellants.
Figure 11:
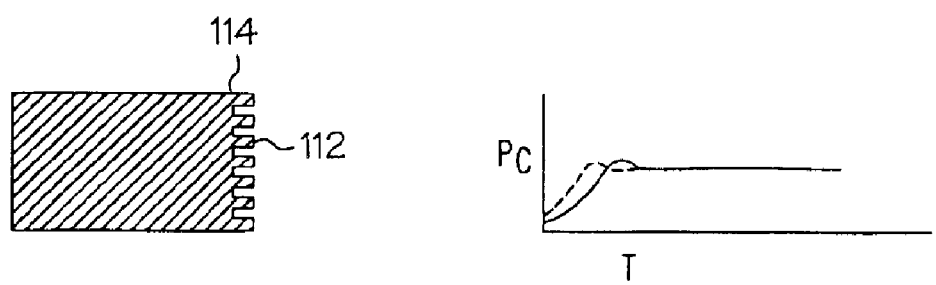
Figure 11:
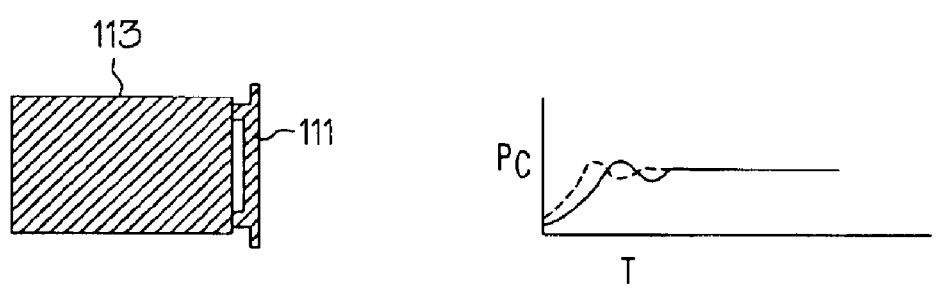
Figure 11:
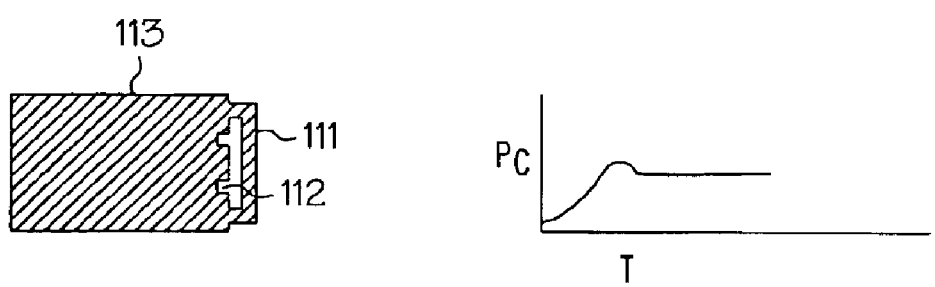

To provide a smooth transition between the ignition and propellant combustion equilibrium conditions, ignition sustainers are often used; the most commonly being a small pellet and/or a disc 111 of energetic propellant bonded to the surface of the grain 113. Grooves 112 cut in the grain face provide increased burning surface and aid in obtaining rapid ignition. The secondary charge, if properly designed, will prevent a "pressure saddle" or momentary lowering of the pressure because of heat losses to the surrounding metal components. FIG. 11 shows the type of saddle that might be expected with various configurations. It shows that, by the proper use of either or both systems, the desired ignition pressure-time curve may be obtained.

Selection of an initiator must depend on the means available for providing heat energy to the primary ignition material. A normal method is the application of an electrical current through a low-resistance (0.02 to 5.0 ohms) bridge-wire, imbedded in a heat-sensitive pyrotechnic composition. A rule of thumb is that the lower the energy of the solid propellant, the greater the ignition system output required. Physical parameters that influence the design of the ignition charge system are free volume, grain configuration, and propellant burning surface. Rapid ignition is assisted greatly by pressurization, but caution must be taken to prevent pressure over-shoot during the ignition phase. When determining the requirements for a new gas generator system, careful consideration should be given to the ignition system before fixing any physical configuration.

Upon receipt of the signal to the initiator(s), the more progressive gas generant undergoes rapid ignition and generates sufficient pressure to inflate the airbag to 35–85% of its full capacity, preferably 45% to 85% of its capacity, and most preferably 65%–85% of its full capacity. The second gas generant (in the second chamber), is initiated at some given time t=45%–95% of $t_{pmax\ (first\ gas\ generator)}$, (i.e., when 45–95% of the gas has been generated from the first generator), preferably 65%–95% of t=45%–95% of $t_{pmax\ (first\ gas\ generator)}$, but most preferably at t=90%–95% of $t_{pmax\ (first\ gas\ generator)}$.

The gas generant in the second chamber provides the remaining inflation of the airbag to achieve an overall internal gas pressure equal to the pressure rated for that airbag for that specific subsystem. That is, when the gas has been completely generated from both chambers of the novel system, the final gas pressure in the airbag is equal to that from the current, one-stage, gas generators. The rate of gas generation in the proposed art is controlled by means of providing propellants that generate different rate of gas release. By providing different rates of gas release, the pressure versus time curve would have two slopes for the two-stage system. One slope (the first gas generant in the first chamber) would have a very steep slope $[(dp)_1/)dt)_1]$. The second slope (for the second gas generant) would have a less steep slope $[(dp)_2/(dt)_2$ The effective time to maximum volume (which corresponds to the full deployment of the airbag) would still be the same, but would be controlled in a manner that would prevent a powerful shock to the airbag. In military applications, this performance is advantageous, as it provides improved control over the trajectory and prevents mishaps resulting from radical changes in trajectory that result from currently used airbag systems.

Having systems with even more than two chambers allows even better control of the pressure vs. time curve, thus enabling the designer to match nearly any pressure vs. time profile.

A typical dual stage (or two-stage) generator according the present invention is shown in FIG. 1. A small-size (miniature size) gas generator 10A is shown in FIG. 1A. In this design two combustion chambers 1 exist within the housing enclosure 2, and are separated by a 3.00-mm thick wall 3. Each combustion chamber contains a propellant 4, with both propellants having the same formulations but different geometry. Propellant geometry is selected to produce the desired $1^{st}$ and $2^{nd}$ stage-performance. Two igniters exist, one for each combustion chamber. The two igniters are designed to function with a 5–20 ms. difference between the progressive (quicker or high $R_Q$), and the neutral (slower, or low $R_Q$) burning propellant. The igniters consist of an ignition enhancer 5, which surrounds the initiator 6 and is designed to boost the power of a propellant upon ignition. Rupture disks 7 allow the released gas to be funneled into the gas ports 8, where the gas is released. In certain embodiments, e.g., the miniature design such as that used in side airbags, a slag filter 9 (heat sink) may be used advantageously. The slag filter is used as a heat sink and not as a particulate filter. The hot gases produced by the gas generator pass through the slag filter and lose heat to the slag filter by conductive heat transfer. In exemplary embodiments, the slag filter may be coated with a sodium aluminosilicate powder, also known as zeolite (e.g., Zeolite CVB-100). This is the case when the gas generant includes CL-20, GAP, and $KNO_3$. In such embodiments, the zeolite coating acts to (1) reduce the gas temperature, thereby reducing the likelihood of (a) burn damage to equipment, (b) premature detonation of the explosive, and it can trap harmful gases such as $NO_x$ and CO. In other words, the zeolites act as molecular traps for larger-size diatomic and polyatomic gases. The percent of zeolites used in the slag filter may range from between 1 and 10%, more preferably from between 3 and 7%, and most preferably at 5%, by weight of the filter. Alternatively, suitable high-surface-area materials may be used to effect the same result.

Figure 1B:
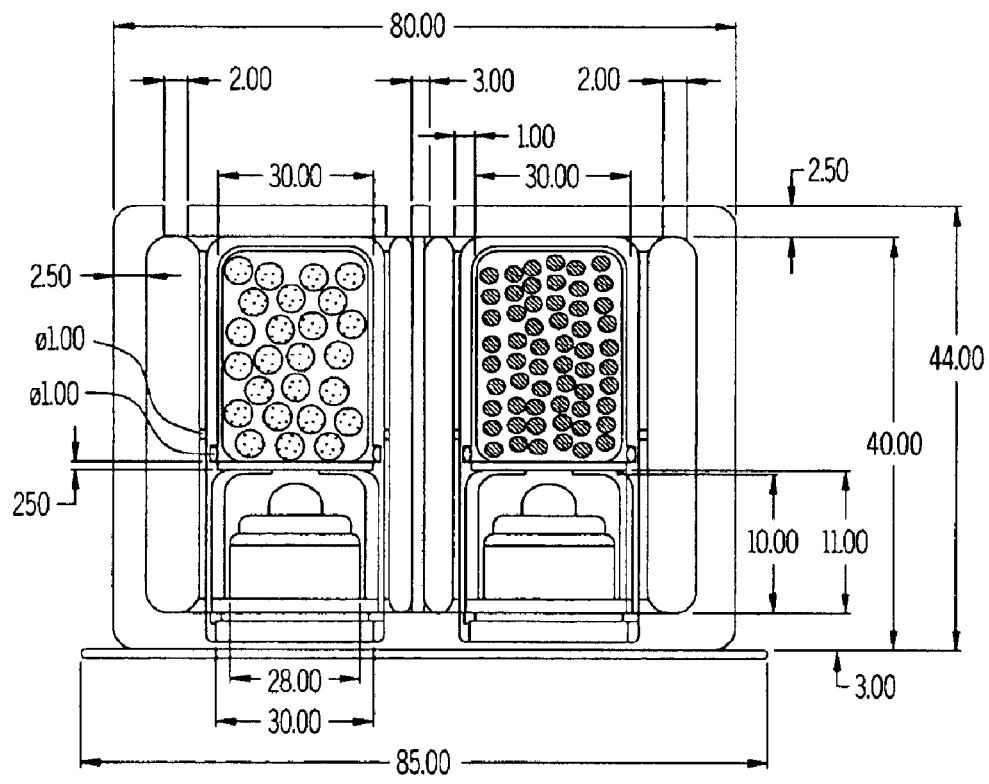

A gas generator for a typical airbag can be quite small. The overall dimensions for one airbag can be approximately 85 mm×44 mm. (The dimensions of such a typical gas generator 10B are shown in FIG. 1B)

For airbags requiring more output (e.g., for larger munitions), more propellant weight is needed and a larger gas generator must be used. The amount of propellant can be calculated and the size gas generator adjusted accordingly.

Figure 1C:
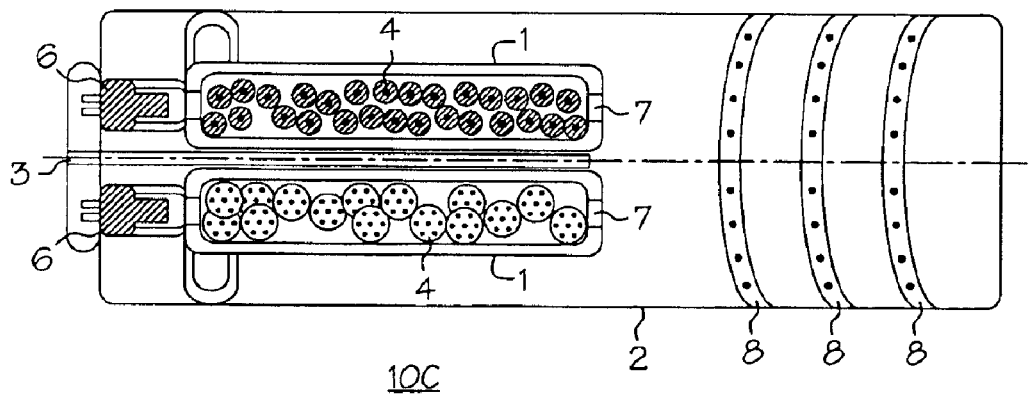
Figure 1D:
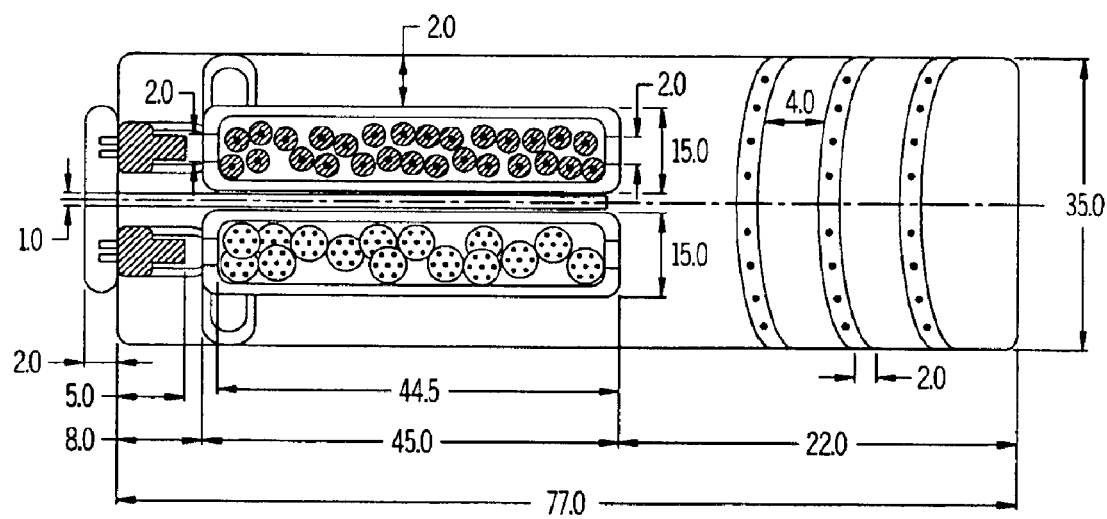

Embodiments of the present invention according to the design shown in FIGS. 1C and 1D (showing gas generators 10C and 10D, respectively) are principally the same, but they are larger in size, with greater mass of the propellant. The partition between the two combustion chambers is aimed at eliminating unnecessary safety concerns, namely preventing propagation to the adjacent combustor port. If one propellant is deployed, the heat produced by the reaction may heat up the propellant in the adjacent chamber, and, upon deploying the second, a severe high pressure may cause the airbag to malfunction.

Other considerations in designing an inflator for a passive airbag restraint system, include the toxicity and noxiousness of the gas that fills the airbag. The inflator for an airbag must exhaust or filter gas and other materials, which might damage parts of the airbag. If the gas-generating composition is highly toxic or unstable, special handling may be required during the manufacturing process and may create disposal problems at the end of the useful life of the device, if any part of the munition (and/or submunition(s)) system survives. For example, raw sodium azide, used as the gas-generating composition in most gas generators (for airbag applications), has a relatively high toxicity, which creates handling problems during the manufacturing process. Furthermore, if military personnel or civilians are exposed to remaining portions of the device, toxicity or environmental pollution concerns may need to be considered.

Currently used airbags must be coated to prevent damage to the bags. Packaging restrictions add a further design consideration in the development of passive airbag inflators. For example, weight and size are primary factors in determining the suitability of vehicle inflator designs.

Figure 3:
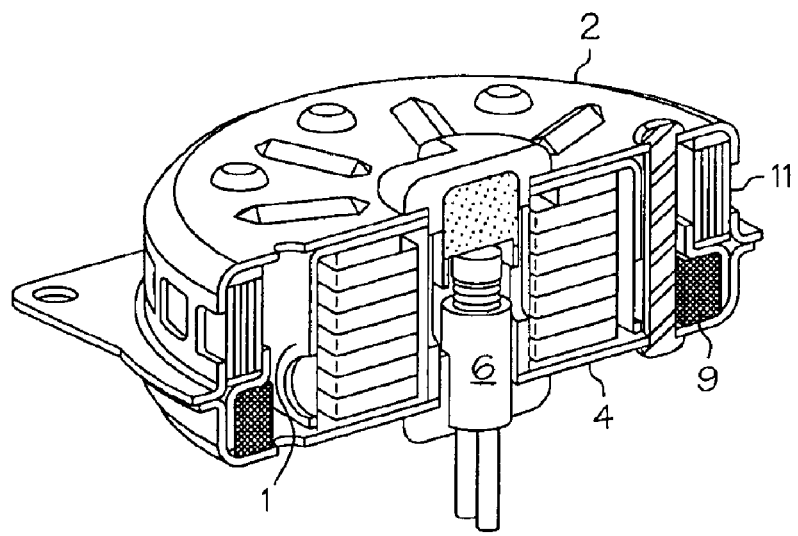
FIG. 3 shows a typical single-stage gas generator currently used.
Figure 4:
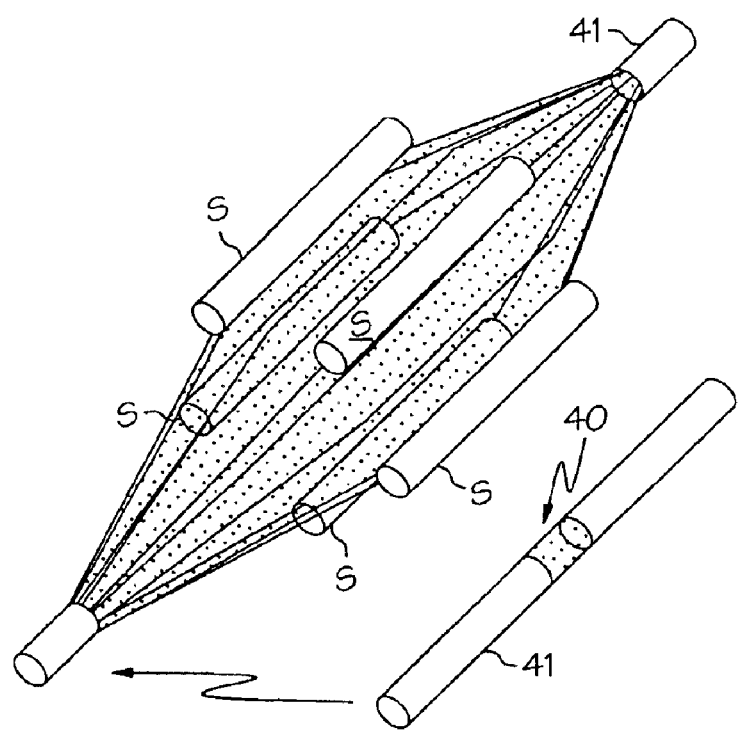
FIG. 4 shows an airbag deploying several submunitions S in a weapon system including gas generator 40 in a spine tube 41.

In the novel gas generator disclosed herein, the need for complex, expensive filter systems (to remove hot, solid byproducts) is eliminated. (Filters are required in the current, one-stage gas generators. See part 11 in FIG. 3.) Elimination of the complex, expensive filter system means at least a 4% reduction in the cost of the gas generator.

The objective of the present invention is to provide a gas generator with reduced weight, size and fewer geometric constraints from the design perspective. It is also an objective to eliminate the need for a filter system. It is also an objective to provide a gas-generating inflator, which eliminates or at least reduces the size of the internal structural members of the pressure vessel (combustion chamber). It is a further objective to provide a less costly gas generator, both in terms of fewer parts and lower process manufacturing operations.

Several propellants used in the new gas generators are novel. One comprises an oxidizer, a fuel, and a binder that is used to hold the components together. The propellant used herein has outstanding performance, is more environmentally acceptable than currently used propellants, and does not require the filtration systems currently needed in gas generators.

The oxidizer is preferably ammonium nitrate, which constitutes approximately 89.5±5.5% of the propellant. The oxidizer is preferably phase-stabilized to prevent melting and recrystallization to different particle size. An example of a suitable phase stabilizer is potassium nitrate ($KNO_3$), which may be is present at a concentration of 0.5% to 7% and which may also prevent flash generation; the preferable concentration of the potassium nitrate is 0.5% to 1%. This nitrogen-rich oxidizer, when stabilized is insensitive to impact, shock and electrostatic discharge, which makes it safe to handle, to manufacture, and to package. The phase-stabilized ammonium nitrate prevents phase transition of the oxidizer during thermal cycling.

The fuel constitutes approximately 8.4±5.0% of the propellant. Suitable fuels include nearly all nitramines, including CL-20 ($C_{10}H_{22}N_{12}O_{12}$)(Thiokol Corporation), RDX ($C_3H_6N_6O_6$), HMX ($C_4H_8N_8O_8$), glycidyl azide polymer (GAP) ($C_3H_5N_3O)_n$ (3M Corporation, Minnesota), ethylene dinitramine (EDNA), TATB, LLM-105 and mixtures thereof. The preferred fuel is CL-20.

The binder constitutes approximately 2.1±0.5% of the propellant and acts (1) as a binder to hold components together; and (2) to prevent fracture of crystals, which would result in gas generating too fast. Suitable binders include polycaprolactone (PCL), polyisobutylene (PIB), polyvinylpyrrolidone, and mixtures thereof.

GAP can be used as a combined fuel and binder. However, its combustion byproducts are toxic and increased amounts of ammonium nitrate are needed to overcome this negative. These higher concentrations of ammonium nitrate make the formulation difficult to process and to ignite.

A second novel system, which is particularly useful for propulsion systems of small, medium and large caliber ammunition, comprises approximately 70–95% of CL-20 energetic nitrate fuel; 5–25% of energetic Polyglacidyl azide (e.g., Glacidyl azide polymer or GAP) or energetic polymer binder (e.g., polyisobutylene: Vistanex polymer or PIB); and 0.1–5.0% of a flash suppressant (e.g., potassium nitrate).

Other ingredients may optionally be added to the formulation. These include materials (1) to control stability (e.g., Ethyl centralite, Akardite I, Akardite II, Diphenyl Amine, or 2-Nitrodiphenyl Amine), used at about 0.1–1.0%; (2) to control ballistic spikes and high initial pressure rise, a coating material (e.g., Ethylene Glycol Dimethacrylate, Diethylene Glycol Dimethacrylate, Allyl Methacrylate or Hercote Polyester), used at about 0.1–3.0%); and (3) to increase gravimetric density and dissipate static, (e.g., graphite) used at about 0.05–1.0%.

The propellant formulation may be processed either as a wet or dry mixture and pressed into tablets, disks or other shapes or extruded into granules. Commonly used blending techniques, such as those discussed in M. E. Fayed & L. Otten, Handbook of Powder Science and Technology (1984), Emil R. Riegel, Chemical Process Machinery ($2^{nd}$ Ed. 1960, and Wolfgang Pietsch, Size Enlargement by Agglomeration Ch. 4 (1991), can be used.

The propellant used in the different chambers generally have the same chemical composition, but they often differ in geometry, which impacts the rate of burning of the propellant in each chamber. For example, a propellant with more perforations has more surface exposure, which results in faster burning.

Figure 2:
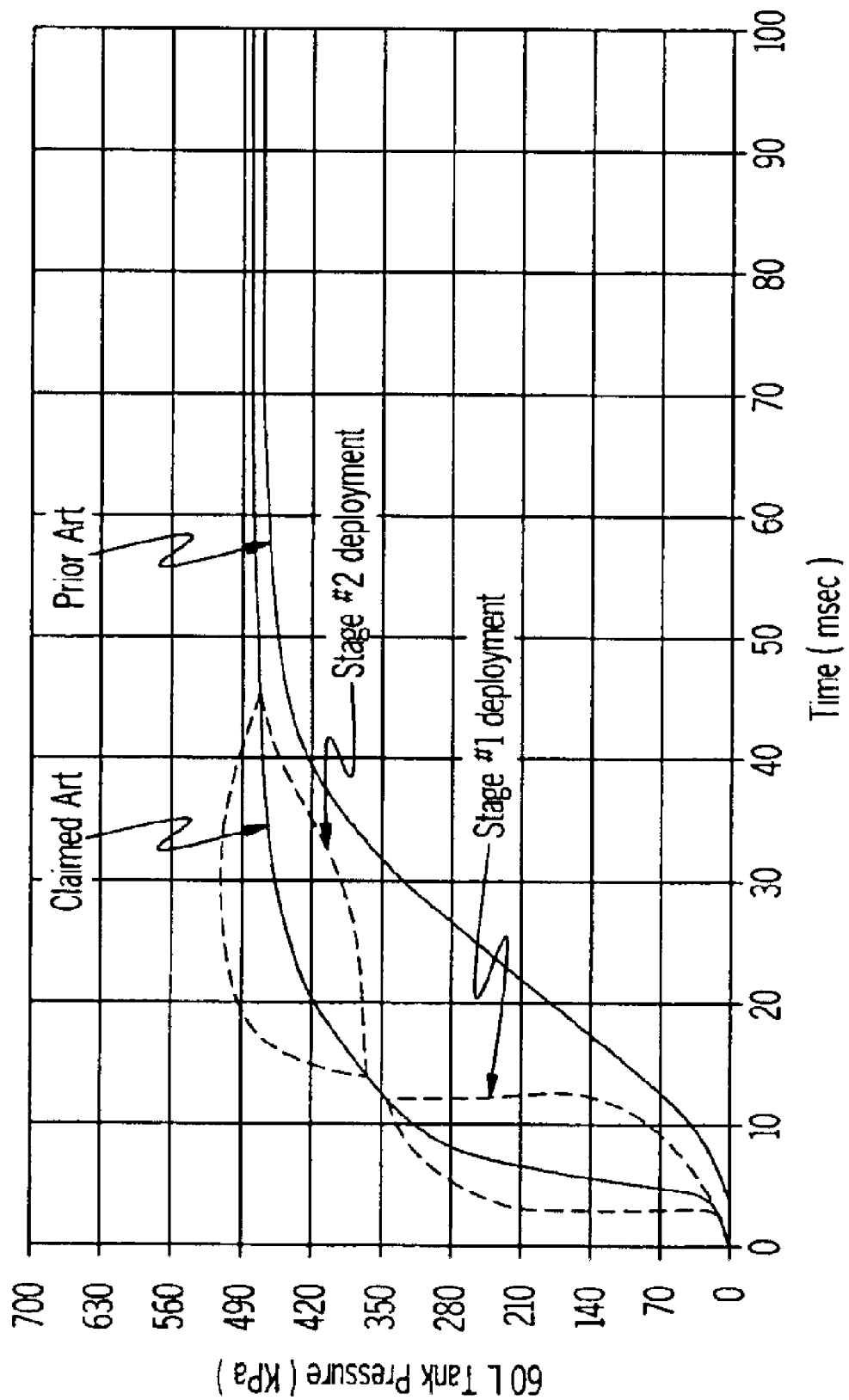
FIG. 2 shows the deployment of a two-stage gas generator compared to that of a single-stage gas generator.

The ability to vary both the time of ignition of each chamber along with varying the perforation geometry yields ultimate control over the inflation characteristics of the airbag. That is, the change of pressure with time can be controlled very well. For example, see FIG. 2, where a two-chamber gas generator is used. At the initial part of the inflation, change of pressure vs. time is much steeper than the control (single stage gas generator), while the rate of change in the second stage is more gradual than the control. Using an airbag having the two-stage gas generator has a much improved control of inflation rate vs. the control (one-stage gas generator).

The density of the propellant is also an important indicator of its suitability. The preferred density should be approximately 92% or greater than the theoretical density. If the density is too low, not as much propellant can be fit into the chambers. Second, if the density is low, the propellant has a greater likelihood that it will fracture, leading to a different geometry of propellant, which will, as discussed above, have an effect on the burn rate.

The combustion of the propellant is safe, with the flame temperature of the gaseous products of reaction being less than 120° F. The products of combustion are generally limited to non-hazardous gases, namely water vapor, nitrogen, and $CO_2$. These products are not hazardous to the environment. In addition, they are not corrosive, which means that uncoated airbags can be used in the system.

The amount of propellant in the novel gas generator is much less than is needed in currently used generators. Typically 70–100 gm of propellant is used in the prior art, while 5–8 gm is needed for the novel generator used for deploying submunitions.

To evaluate the performance of the gas generator, it is possible to use a ballistic tank test. The tank should have a capacity at least as large as the airbag for which the gas generator is used. Any commonly used ballistic test procedures can be used to evaluate the performance of the gas generator.

The following examples are intended to further illustrate, not limit, the invention disclosed herein.

EXAMPLE 1

A Two-Stage Gas Generator

A two-stage gas generator is shown in FIG. 1. FIG. 1A shows the parts of the generator, while FIG. 1B shows an embodiment used in an airbag for deploying submunitions. The total weight of propellant in this system is approximately 5 to 10 gm.

EXAMPLE 2

Performance Data

The performance of an embodiment of one propellant according to the present invention comprising 87% CL-20, 12% polyglycidyl azide and 1% potassium nitrate (see Table 1A), compared to a previously used propellant (Tables 1B), is shown as evaluated by a thermochemical simulation program (written in FORTRAN). The program shows the theoretical, thermochemical performance of the gas generant. The output shown lists, among other things, the expected theoretical density, the reaction temperature inside the chamber, the ratio of specific heats (shown as gamma), and the energy (impetus). It also lists the expected byproducts of combustion in moles, wt %, mole %, and volume %. The output values shown are based on 100 grams of propellant.

EXAMPLE 3

Submunition Deployment

A munition system is assembled by surrounding a rocket with submunitions. Between the rocket and the submunitions is inserted an airbag. The system also includes a gas generator having at least two chambers. When the system is in the vicinity of the intended target(s), the gas generator becomes operational and inflates the airbag, thus deploying the submunitions. By having two or more chambers, the gas generator can inflate the airbag in a more predictable fashion than the one-chamber gas generator. This means that the submunitions will be deployed closer to the intended target.

EXAMPLE 4

Using an Airbag to Control the Trajectory of a Submunition

Figure 5A:
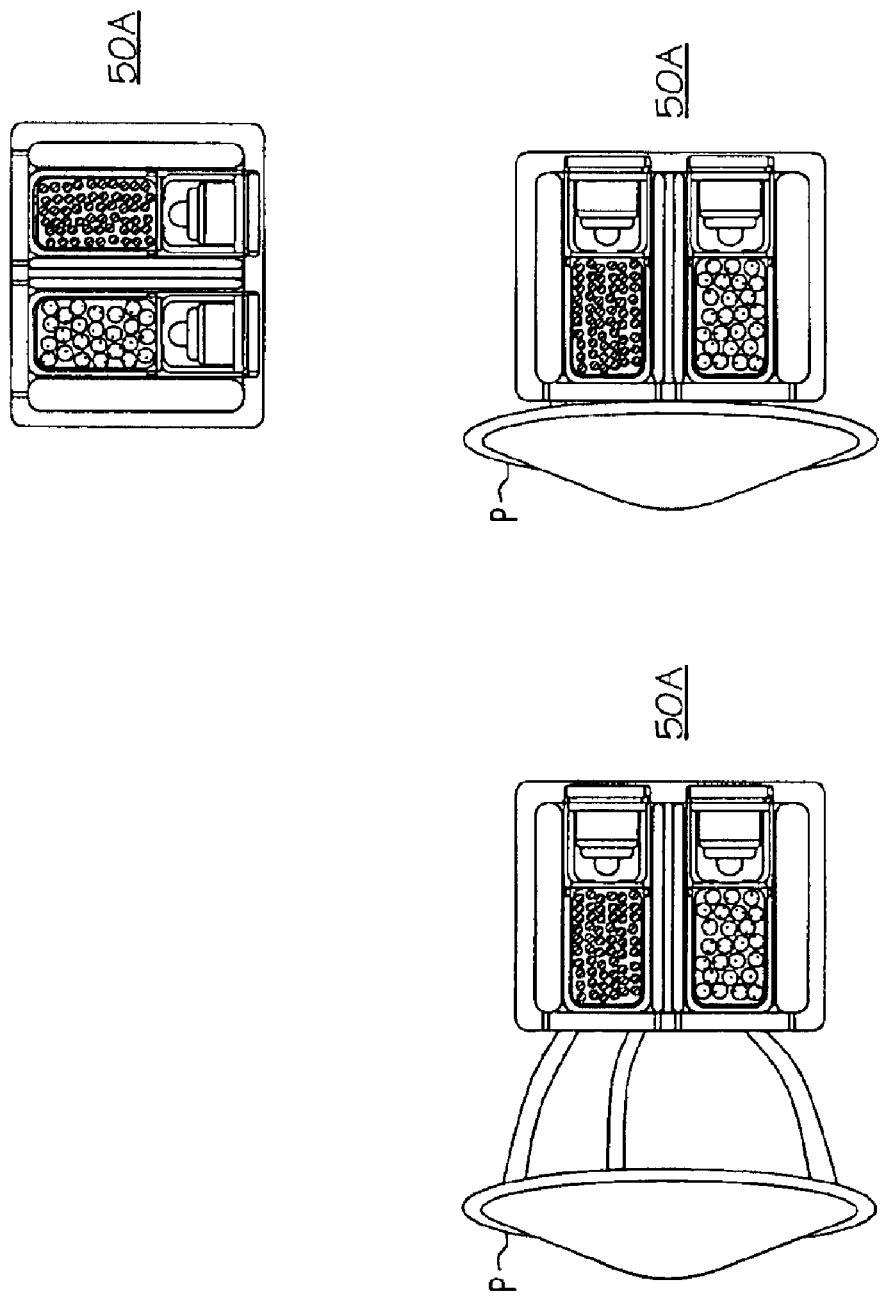

Once the submunition of Example 3 is beginning its downward trajectory, an airbag connected to a parachute P on the submunition is inflated in order to deploy the parachute P. See FIG. 5A. This gas generator 50A has two or more chambers, and there is better control over the deployment of the parachute and, therefore, the trajectory of the submunition vs. earlier systems containing only one chamber in the gas generator. The parachute reduces the speed of the submunition and also balances it during its horizontal, transitional path and its downward freefall.

Figure 5B:
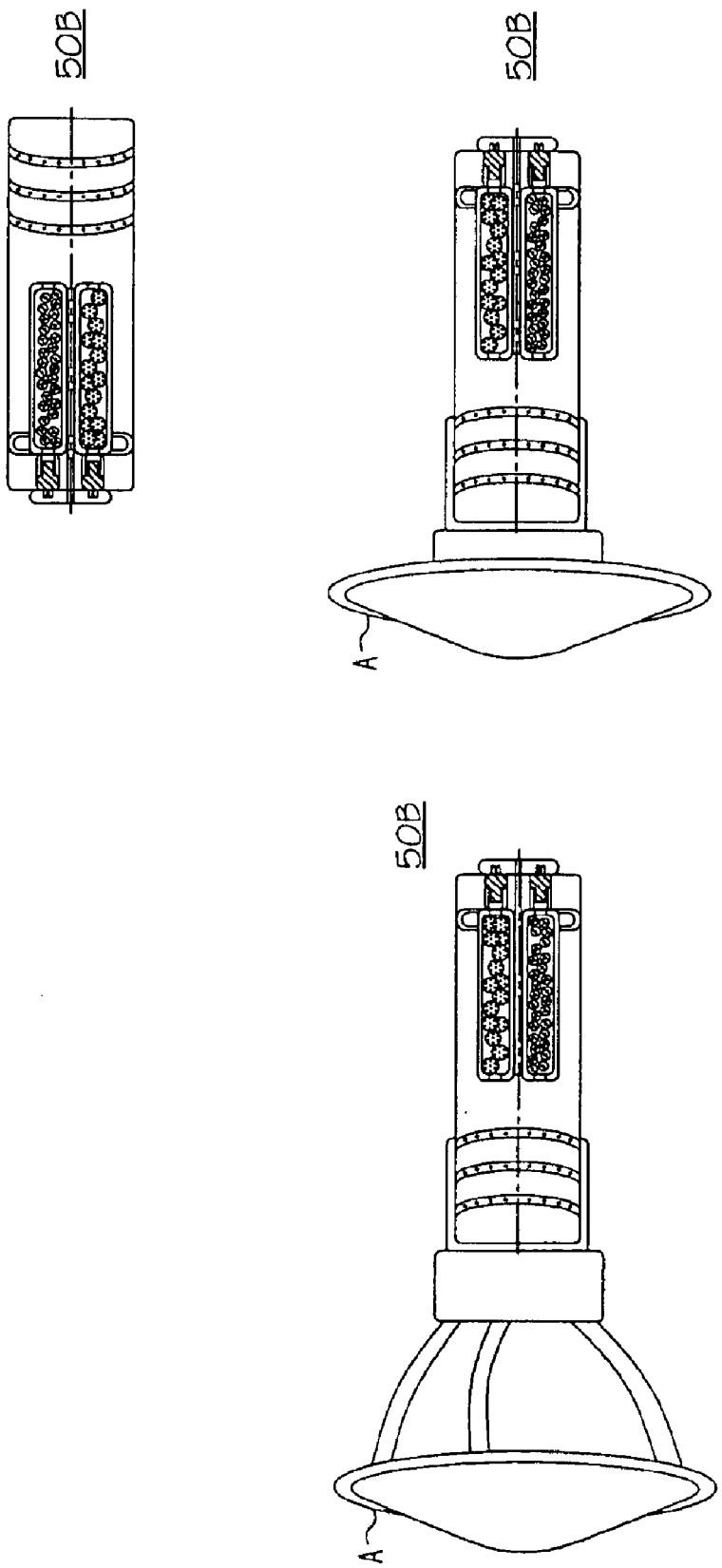

An alternative to the parachute is the use of the airbag itself to provide buoyancy to the submunition. See FIG. 5B. The airbag is attached to the submunition and, when inflated, acts like a balloon-type object. This airbag is inflated by the gas from the gas generator 50B and, rather than providing drag, which is provided by the parachute, the airbag provides buoyancy, which also impacts the trajectory of the submunition. (See FIG. 5B, where the parachute P is replaced with an airbag A (a balloon-like object), which is inflated by the gas generator 50B.)

EXAMPLE 5

Use of Gas Generator for Propelling Ammunition

A gas generator can be used to propel ammunition. Instead of gunpowder being used in ammunition casing, a gas generator can be used. The gas generator can be enclosed in a separate component (e.g., plastic or ceramic) placed in the muzzle before the ammunition. Alternatively, the gas generator can be loaded into the barrel 59 of the weapon, with no need for a casing, as shown in FIG. 5C, with gas generator 50C and projectile 58.

The amount of gas generant needed to propel munitions can be calculated using well-known formulas, which relate the amount of gas generant to the pressure generated and to the velocity of the munition. For example:

55–65 kpsi needed to propel any medium caliper round at a muzzle velocity equal to or 15% faster than current specifications.

55–65 kpsi is needed to propel a M919 medium caliper round at a muzzle velocity of 2000 m/s. (The M919 cartridge is a 25 mm, armor piercing, fin stabilized, discarding sabot, with tracer.)

65–75 kpsi needed to propel any large caliper round at a muzzle velocity equal to or 30% faster than current specifications.

EXAMPLE 6

Ignition System

Because of the need to ignite at a specific time the propellant in each chamber of the gas generator, it is critical that the ignition in one chamber does not accidentally ignite the propellant in another chamber. Furthermore, it is important that the chambers ignite at a specific time, since the gas generation rate from each chamber controls the inflation rate of the airbag.

For example, the first chamber of a typical two-chamber gas generator might generate 8–20% of the total amount of gas needed to inflate the airbag within, e.g., 10 milliseconds. The preferred fraction of the gas from the first chamber is 10–15%, and the most preferred amount is 15% of the total amount of gas needed.

The ignition system for the second chamber should ignite approximately at the end of the gas generation from the first chamber, and the rate of inflation from that chamber should control the final activity for which the airbag is used. For example, a rate combined burn time for both the first and second stage of, preferably, between 60 and 90 milliseconds is needed to eject the submunitions from a munition or to deploy a parachute to control the trajectory of a submunition.

Those familiar with this technology area will recognize that there are other variations of the invention that are consistent with the invention disclosed herein. While certain dimensions have been provided regarding exemplary embodiments, such embodiments or dimensions do not limit the scope of the present invention. The present invention may include any embodiments of any size that encompass the aspects described herein or equivalents thereto.

TABLE 1A

THERMOCHEMICAL CODE CALCULATION

| NON-IDEAL EQUATION OF STATE HEP-100 PROPULSIONS-EXPLOSIVES | | |
|---|---|---|
| POLYGLYCIDYL AZIDE | 12.000 | |
| POTASSIUM NITRATE | 1.000 | |
| CL-20 | 87.000 | |
| | DATE | SETUP 5 |

TABLE 1A-continued

THERMOCHEMICAL CODE CALCULATION

OHFP = 21349.29 THEO DENSITY = 1.9101 GM/CC .069008 LBM/IN**3 E = .0
 EFP = 23119.04 OXYGEN BALANCE = −14.14 TO CO2, 11.02 TO
CO OMOX = 1.6337
C 1.5723 H .62178 X .0098905 N 2.7755 O 2.5767
S .1000E−6
0POINT ON HUGONIOT - - SHOCK VELOCITY = 2362.98 M/SEC,
PARTICLE V = 1088.8
P = 100000. PSI P = 6804.60 ATM T = 4833.3 NG = 3.45327
NT = 3.45327 S = 196.755
CPG = 35.316 CPT = 35.316 FIXED CP GAMMA = 1.241 DHDT = 68.4529
GAMMA = 1.18404
WT PCT COND = .00000 MW GAS = 28.959 H = 68673 COV = .00000
VSP = 2.01273
SONIC VEO = 1251.54
 RHO = .49683756 PO = 1.9990 VO = 3.73251
 IMPETUS = 464268
E = 35505.381 DEDT = 54.0953

| 0PRODUCT | MW | MOLES | WT. PCT. | MOLE PCT. | VOLUME PCT |
|---|---|---|---|---|---|
| C H2O | 30.02649 | 5.73721E−05 | .0017 | .0017 | .0017 |
| C H3 | 15.03506 | 5.15695E−07 | .0000 | .0000 | .0000 |
| C H4 | 16.04303 | 5.18412E−08 | .0000 | .0000 | .0000 |
| C N | 26.01785 | 4.79911E−05 | .0012 | .0014 | .0014 |
| C O | 28.01055 | 1.07953E+00 | 30.2381 | 31.2610 | 31.2610 |
| C O S | 60.07455 | 1.46572E−09 | .0000 | .0000 | .0000 |
| C O2 | 44.00995 | 4.90906E−01 | 21.6047 | 14.2157 | 14.2157 |
| C S | 44.07515 | 4.69393E−11 | .0000 | .0000 | .0000 |
| C S2 | 76.13915 | 9.86104E−19 | .0000 | .0000 | .0000 |
| C2H2 | 26.03824 | 4.86256E−08 | .0000 | .0000 | .0000 |
| C2H4 | 28.05418 | 4.45480E−11 | .0000 | .0000 | .0000 |
| H | 1.00797 | 2.61555E−02 | .0264 | .7574 | .7574 |
| H C N | 27.02582 | 2.58048E−04 | .0070 | .0075 | .0075 |
| H C O | 29.01852 | 1.34084E−03 | .0389 | .0388 | .0388 |
| H N O | 31.01407 | 5.49614E−04 | .0170 | .0159 | .0159 |
| H N O2 | 47.01347 | 1.02943E−04 | .0048 | .0030 | .0030 |
| H O2 | 33.00677 | 1.19781E−03 | .0395 | .0347 | .0347 |
| H2 | 2.01594 | 4.84599E−02 | .0977 | 1.4033 | 1.4033 |
| H2O | 18.01534 | 1.99950E−01 | 3.6022 | 5.7902 | 5.7902 |
| H2S | 34.07994 | 1.21951E−09 | .0000 | .0000 | .0000 |
| K | 39.10200 | 1.47607E−03 | .0577 | .0427 | .0427 |
| K C N | 65.11985 | 2.53874E−05 | .0017 | .0007 | .0007 |
| K H | 40.10997 | 1.95433E−04 | .0078 | .0057 | .0057 |
| K O | 55.10140 | 9.95250E−04 | .0548 | .0288 | .0288 |
| K O H | 56.10937 | 7.19459E−03 | .4037 | .2083 | .2083 |
| K2 | 78.20400 | 1.71521E−06 | .0001 | .0000 | .0000 |
| K2O2H2 | 112.21874 | 1.77041E−07 | .0000 | .0000 | .0000 |
| N | 14.00670 | 5.70115E−04 | .0080 | .0165 | .0165 |
| N C O | 42.01725 | 1.04003E−04 | .0044 | .0030 | .0030 |
| N H | 15.01467 | 2.45661E−04 | .0037 | .0071 | .0071 |
| N H2 | 16.02264 | 1.70369E−04 | .0027 | .0049 | .0049 |
| N H3 | 17.03061 | 8.51301E−05 | .0014 | .0025 | .0025 |
| N O | 30.00610 | 1.08944E−01 | 3.2690 | 3.1548 | 3.1548 |
| N O2 | 46.00550 | 4.53166E−04 | .0208 | .0131 | .0131 |
| N2 | 28.01340 | 1.33158E+00 | 37.3021 | 38.5599 | 38.5599 |
| N2O | 44.01280 | 3.57999E−04 | .0158 | .0104 | .0104 |
| O | 15.99940 | 2.53593E−02 | .4057 | .7344 | .7344 |
| O H | 17.00737 | 8.69124E−02 | 1.4782 | 2.5168 | 2.5168 |
| O2 | 31.99880 | 3.99547E−02 | 1.2785 | 1.1570 | 1.1570 |
| O2N H | 47.01347 | 9.51024E−05 | .0045 | .0028 | .0028 |
| S | 32.06400 | 3.70221E−09 | .0000 | .0000 | .0000 |
| S H | 33.07197 | 4.65480E−09 | .0000 | .0000 | .0000 |
| S N | 46.07070 | 8.97632E−10 | .0000 | .0000 | .0000 |
| S O | 48.06340 | 3.61416E−08 | .0000 | .0000 | .0000 |
| S O2 | 64.06280 | 5.17637E−08 | .0000 | .0000 | .0000 |
| S O3 | 80.06220 | 1.07851E−10 | .0000 | .0000 | .0000 |
| S2 | 64.12800 | 5.30001E−16 | .0000 | .0000 | .0000 |
| S2O | 80.12740 | 1.89955E−16 | .0000 | .0000 | .0000 |
| C(C) | 12.01115 | 0.00000E+00 | .0000 | .0000 | |
| K(L) | 39.10200 | 0.00000E+00 | .0000 | .0000 | |
| K O H(C2) | 56.10937 | 0.00000E+00 | .0000 | .0000 | |
| K O H (L) | 56.10937 | 0.00000E+00 | .0000 | .0000 | |
| K O2(C) | 71.10080 | 0.00000E+00 | .0000 | .0000 | |
| K2C O3(C) | 138.21335 | 0.00000E+00 | .0000 | .0000 | |
| K2C O3(L) | 138.21335 | 0.00000E+00 | .0000 | .0000 | |
| K2O(C) | 94.20340 | 0.00000E+00 | .0000 | .0000 | |
| K2S O4(C1) | 174.26560 | 0.00000E+00 | .0000 | .0000 | |

TABLE 1A-continued

THERMOCHEMICAL CODE CALCULATION

| | | | |
|---|---|---|---|
| K2S O4(C2) | 174.26560 | 0.00000E+00 | .0000 | .0000 |
| K2S 04(L) | 174.26560 | 0.00000E+00 | .0000 | .0000 |

TABLE 1B

0PRESSURE IS LESS THAN EXPLOSION PRESSURE - SHOCK VELOCITY NOT DEFINED
0POINT ON HUGONIOT - - SHOCK VELOCITY = .00 M/SEC, PARTICLE V = .0
P = 14.6960 PSI P = 1.00000 ATM T = 3014.1 NG = 3.52045
NT = 3.52045 S = 242.971
CPG = 34.420 CPT = 34.420 FIXED CP GAMMA = 1.255 DHDT = 137.180
GAMMA = 1.12634
WT PCT COND = .00000 MW GAS = 28.405 H = 10812 COV = .00000
VSP = 8706.95
SONIC VEL = 996.843
RHO = .00011485 PO = 1.9990 VO = 3.73251
IMPETUS = 295154
E = −10273.488 DEDT = 117.968

| 0PRODUCT | MW | MOLES | WT. PCT. | MOLE PCT. | VOLUME PCT |
|---|---|---|---|---|---|
| C H2O | 30.02649 | 9.73010E−09 | .0000 | .0000 | .0000 |
| C H3 | 15.03506 | 1.29801E−12 | .0000 | .0000 | .0000 |
| C H4 | 16.04303 | 4.42698E−14 | .0000 | .0000 | .0000 |
| C N | 26.01785 | 7.88188E−09 | .0000 | .0000 | .0000 |
| C O | 28.01055 | 1.09242E+00 | 30.5993 | 31.0308 | 31.0308 |
| C O S | 60.07455 | 1.27987E−11 | .0000 | .0000 | .0000 |
| C O2 | 44.00995 | 4.79843E−01 | 21.1179 | 13.6302 | 13.6302 |
| C S | 44.07515 | 5.71998E−14 | .0000 | .0000 | .0000 |
| C S2 | 76.13915 | 7.89886E−23 | .0000 | .0000 | .0000 |
| C2H2 | 26.03824 | 2.82446E−15 | .0000 | .0000 | .0000 |
| C2H4 | 28.05418 | 6.63577E−21 | .0000 | .0000 | .0000 |
| H | 1.00797 | 7.26263E−02 | .0732 | 2.0630 | 2.0630 |
| H C N | 27.02582 | 4.70143E−08 | .0000 | .0000 | .0000 |
| H C O | 29.01852 | 1.71113E−06 | .0000 | .0000 | .0000 |
| H N O | 31.01407 | 2.41025E−06 | .0001 | .0001 | .0001 |
| H N O2 | 47.01347 | 9.20798E−08 | .0000 | .0000 | .0000 |
| H O2 | 33.00677 | 3.16439E−05 | .0010 | .0009 | .0009 |
| H2 | 2.01594 | 5.57205E−02 | .1123 | 1.5828 | 1.5828 |
| H2O | 18.01534 | 1.78301E−01 | 3.2121 | 5.0647 | 5.0647 |
| H2S | 34.07994 | 1.53108E−11 | .0000 | .0000 | .0000 |
| K | 39.10200 | 8.57419E−03 | .3353 | .2436 | .2436 |
| K C N | 65.11985 | 2.86715E−09 | .0000 | .0000 | .0000 |
| K H | 40.10997 | 9.22469E−06 | .0004 | .0003 | .0003 |
| K O | 55.10140 | 1.41564E−04 | .0078 | .0040 | .0040 |
| K O H | 56.10937 | 1.16550E−03 | .0654 | .0331 | .0331 |
| K2 | 78.20400 | 2.10895E−08 | .0000 | .0000 | .0000 |
| K2O2H2 | 112.21874 | 9.54520E−12 | .0000 | .0000 | .0000 |
| N | 14.00670 | 3.31682E−05 | .0005 | .0009 | .0009 |
| N C O | 42.01725 | 1.66628E−08 | .0000 | .0000 | .0000 |
| N H | 15.01467 | 9.14180E−07 | .0000 | .0000 | .0000 |
| N H2 | 16.02264 | 1.41625E−07 | .0000 | .0000 | .0000 |
| N H3 | 17.03061 | 3.11613E−08 | .0000 | .0000 | .0000 |
| N O | 30.00610 | 4.12393E−02 | 1.2374 | 1.1714 | 1.1714 |
| N O2 | 46.00550 | 6.91077E−06 | .0003 | .0002 | .0002 |
| N2 | 28.01340 | 1.36712E+00 | 38.2957 | 38.8337 | 38.8337 |
| N2O | 44.01280 | 1.47549E−06 | .0001 | .0000 | .0000 |
| O | 15.99940 | 6.28401E−02 | 1.0054 | 1.7850 | 1.7850 |
| O H | 17.00737 | 7.99003E−02 | 1.3589 | 2.2696 | 2.2696 |
| O2 | 31.99880 | 8.04668E−02 | 2.5748 | 2.2857 | 2.2857 |
| O2N H | 47.01347 | 8.23853E−08 | .0000 | .0000 | .0000 |
| S | 32.06400 | 2.63825E−09 | .0000 | .0000 | .0000 |
| S H | 33.07197 | 4.00777E−10 | .0000 | .0000 | .0000 |
| S N | 46.07070 | 1.08137E−11 | .0000 | .0000 | .0000 |
| S O | 48.06340 | 2.92633E−08 | .0000 | .0000 | .0000 |
| S O2 | 64.06280 | 6.76497E−08 | .0000 | .0000 | .0000 |
| S O3 | 80.06220 | 9.04600E−12 | .0000 | .0000 | .0000 |
| S2 | 64.12800 | 2.86853E−17 | .0000 | .0000 | .0000 |
| S2O | 80.12740 | 3.09761E−18 | .0000 | .0000 | .0000 |
| C(C) | 12.01115 | 0.00000E+00 | .0000 | .0000 | |
| K(L) | 39.10200 | 0.00000E+00 | .0000 | .0000 | |
| K O H(C2) | 56.10937 | 0.00000E+00 | .0000 | .0000 | |
| K O H (L) | 56.10937 | 0.00000e+00 | .0000 | .0000 | |

TABLE 1B-continued

| | | | | |
|---|---|---|---|---|
| K O2(C) | 71.10080 | 0.00000E+00 | .0000 | .0000 |
| K2C O3(C) | 138.21335 | 0.00000E+00 | .0000 | .0000 |
| K2C O3(L) | 138.21335 | 0.00000E+00 | .0000 | .0000 |
| K2O(C) | 94.20340 | 0.00000E+00 | .0000 | .0000 |
| K2S O4(C1) | 174.26560 | 0.00000E+00 | .0000 | .0000 |
| K2S O4(C2) | 174.26560 | 0.00000E+00 | .0000 | .0000 |
| K2S 04(L) | 174.26560 | 0.00000E+00 | .0000 | .0000 |

What is claimed is:

1. A gas generator for military applications comprising at least first and second adjacent gas generation compartments, each being capable of discharging gas therefrom at a different time and different volumetric rate, wherein each compartment contains the same propellant and an initiator, further wherein the propellant has a different geometry in each compartment which results in different rates of gas evolution from each compartment upon initiation such that the ratio of gas generation in the first compartment to that in the second compartment is greater than one; and also wherein said propellant consists essentially of on a weight basis approximately (a) 84–95% of phase-stabilized ammonium nitrate as an oxidizer, (b) 3.4–13.4% of a fuel selected from the group consisting of hexanitrohexaazaisowurtzitane (CL-20), cyclotrimethylenetribitramine (RDX), cyclotetramethylene-tetranitramine (HMX), nitroguanidine (NGU), tri-amino-trinitro-benzene (TATB), 2,6-diamino-3,5-dinitropyrazine-1-oxide (LLM-105), ethylene dinitramine (EDNA), and mixtures thereof, and (c) 1.5–2.6% of a binder selected from the group consisting of polycaprolactone (PCL), polyisobutylene (PIB), and polyvinylpyrrolidone, and mixtures thereof, wherein the products of combustion of said propellant are non-toxic gases and are non-metallic.

2. A gas generator according to claim 1 wherein the change of pressure as a function of time from the first of said compartments is at least 2 times greater than the change of pressure as a function of time from the second of said compartments.

3. A gas generator according to claim 1 wherein the products of combustion of said propellant consist of water, nitrogen and $CO_2$.

4. A gas generator according to claim 1 wherein said propellant is made by
   a. preparing a mixture of the components of said propellant in wet or dry form,
   b. forming said mixture into tablets, disks or granules,
   c. if wet, allowing said tablets, disks or granules to dry, and
   d. perforating said tablets, disks or granules to achieve the desired geometry.

5. A gas generator according to claim 1 wherein said propellant has density greater than or equal to approximately 92% of theoretical density.

6. A gas generator for military applications comprising at least two chambers, each said chamber being capable of discharging gas therefrom at a different time and different volumetric rate, each said chamber containing the same propellant and an initiator, wherein said propellant comprises on a weight basis approximately (a) 84–95% of an oxidizer, (b) 3.4–13.4% of a fuel, and (c) 1.5–2.6% of a binder, wherein the products of combustion of said propellant are non-toxic gases and are non-metallic, further wherein said oxidizer is ammonium nitrate, said fuel is hexanitrohexaazaisowurtzitane (CL-20), and said binder is polycaprolactone (PCL).

7. The gas generator of claim 6, wherein said propellant comprises by weight approximately 89.5% ammonium nitrate, approximately 8.4% hexanitrohexaazaisowurtzitane (CL-20), and approximately 2.1% polycaprolactone (PCL).

8. A process for controlling the rate of inflation of an airbag used in military applications, comprising the following sequential steps:
   a. connecting to said airbag a gas generator comprising at least first and second adjacent gas generation compartments, each being capable of discharging gas therefrom at a different time and different volumetric rate,
   wherein each compartment contains the same propellant and an initiator, further wherein the propellant has a different geometry in each compartment which results in different rates of gas evolution from each compartment upon initiation such that the ratio of gas generation in the first compartment to that in the second compartment is greater than one; and also wherein said propellant consists essentially of on a weight basis approximately (a) 84–95% of phase-stabilized ammonium nitrate as an oxidizer, (b) 3.4–13.4% of a fuel selected from the group consisting of hexanitrohexaazaisowurtzitane (CL-20), cyclotrimethylenetribitramine (RDX), cyclotetramethylenetetranitramine (HMX), nitroguanidine (NGU), tri-amino-trinitro-benzene (TATB), 2,6-diamino-3,5-dinitropyrazine-1-oxide (LLM-105), ethylene dinitramine (EDNA), and mixtures thereof, and (c) 1.5–2.6% of a binder selected from the group consisting of polycaprolactone (PCL), polyisobutylene (PIB), and polyvinylpyrrolidone, and mixtures thereof,
   wherein the products of combustion of said propellant non-toxic gases and are non-metallic,
   b. causing each of said compartments to discharge at a different, predetermined time, and
   c causing the effluent of each of said compartments to flow into said airbag.

9. A process according to claim 8 wherein said oxidizer is ammonium nitrate, said fuel is hexanitrohexaazaisowurtzitane (CL-2), and said binder is polycaprolactone (PCL).

10. A process according to claim 8 wherein said propellant comprises by weight approximately 89.5% ammonium nitrate, approximately 8.4% hexanitrohexaazaisowurtzitane (CL-20), and approximately 2.1% polycaprolactone (PCL).

11. A process according to claim 8 wherein the change of pressure as a function of time from the first of said compartments is at least 2 times greater than the change of pressure as a function of time from the second of said compartments.

12. A process according to claim 8 wherein the products of combustion of said propellant consist of water, nitrogen and $CO_2$.

13. A process according to claim 8 wherein said propellant is made by
   a. preparing a mixture of the components of said propellant in wet or dry form, b. forming said mixture into tablets, disks or granules,
c. if wet, allowing said tablets, disks or granules to dry, and
d. perforating said tablets, disks or granules to achieve the desired geometry.

14. A process according to claim 8 wherein said propellant has density greater than or equal to approximately 92% of theoretical density.

* * * * *